(12) United States Patent
Vorster et al.

(10) Patent No.: US 12,178,225 B2
(45) Date of Patent: Dec. 31, 2024

(54) CITRUS FLAVOUR COMPOSITIONS, THEIR USE AND METHOD OF IMPROVING ORGANOLEPTIC PROPERTIES

(71) Applicant: Givaudan SA, Vernier (CH)

(72) Inventors: Susanna Magdalena Vorster, Bussum (NL); Yixiao Gong, Bussum (NL); Gesa Haseleu, Amsterdam (NL); Eric Houben, Almere (NL)

(73) Assignee: GIVAUDAN SA, Vernier (CH)

( * ) Notice: Subject to any disclaimer, the term of this patent is extended or adjusted under 35 U.S.C. 154(b) by 691 days.

(21) Appl. No.: 17/262,739

(22) PCT Filed: Jul. 25, 2018

(86) PCT No.: PCT/EP2018/070129
§ 371 (c)(1),
(2) Date: Jan. 24, 2021

(87) PCT Pub. No.: WO2020/020450
PCT Pub. Date: Jan. 30, 2020

(65) Prior Publication Data
US 2021/0235734 A1  Aug. 5, 2021

(51) Int. Cl.
| | | |
|---|---|---|
| *A23L 13/40* | (2023.01) | |
| *A23F 3/40* | (2006.01) | |
| *A23L 2/56* | (2006.01) | |
| *A23L 27/12* | (2016.01) | |

(52) U.S. Cl.
CPC ............ *A23L 13/428* (2016.08); *A23F 3/405* (2013.01); *A23L 2/56* (2013.01); *A23L 27/13* (2016.08)

(58) Field of Classification Search
CPC ... C12G 3/06; A23L 2/56; A23L 27/88; A23L 13/428; A23L 27/13; A23F 3/405; C12J 1/08
See application file for complete search history.

(56) References Cited

U.S. PATENT DOCUMENTS

| | | | |
|---|---|---|---|
| 4,913,923 | A | 4/1990 | Van Den Ouweland |
| 2015/0305390 | A1 | 10/2015 | Vrljic et al. |

FOREIGN PATENT DOCUMENTS

| | | |
|---|---|---|
| EP | 2832234 A1 | 2/2015 |
| GB | 1381655 A | 1/1975 |
| JP | 2002345430 A | 12/2001 |
| JP | 2002253141 A | 9/2002 |
| JP | 2014018098 A | 2/2014 |
| KR | 20140129439 A | 11/2014 |
| KR | 20150145958 A | 12/2015 |
| WO | WO-2013149031 A2 * | 10/2013 ......... A23C 19/0925 |

OTHER PUBLICATIONS

International Search Report for International Application No. PCT/EP2018/070129 dated Jan. 7, 2019.
Written Opinion of the International Searching Authority for International Application No. PCT/EP2018/070129 dated Jan. 7, 2019.

* cited by examiner

*Primary Examiner* — Vera Stulii
(74) *Attorney, Agent, or Firm* — Curatolo Sidoti & Trillis Co., LPA; Floyd Trillis, III; Salvatore A. Sidoti

(57) ABSTRACT

A flavour composition is provided. The composition includes a characterizing citrus flavour and a taste modifying composition. The taste modifying composition includes at least two aliphatic amino acids; at least one additional amino acid selected from the group consisting of acidic, basic, aromatic, hydroxylic and mixtures thereof; at least one organic acid; at least one sugar and at least one mineral.

15 Claims, No Drawings

CITRUS FLAVOUR COMPOSITIONS, THEIR USE AND METHOD OF IMPROVING ORGANOLEPTIC PROPERTIES

CROSS REFERENCE TO RELATED APPLICATIONS

This application is a national stage application of International Application No. PCT/EP2018/070129, filed 25 Jul. 2018, which is incorporated herein by reference in its entirety.

FIELD OF THE INVENTION

The present disclosure relates to flavour and aroma compositions suitable for use in a wide variety of consumables or applications. More particularly, the present disclosure relates to citrus flavour and aroma compositions useful in delivering a taste and aroma perception which is closer to freshly squeezed in character than current commercial flavours.

BACKGROUND OF THE INVENTION

There is a growing consumer demand for flavored comestibles especially in savoury applications, having an improved freshness profile. This is especially the case in the citrus category. In the past, this has been achieved by adding back the very volatile flavor ingredients lost during processing or by minimizing the thermal processing that the juice undergoes.

Creating a real authentic citrus profile in a savoury application is challenging as current flavour tools are aroma dominant and often have a sweet and/or candy note. Such notes are not desired in savoury applications and are associated with "artificial" or "un-authentic" citrus profiles.

There is a need, therefore, to provide flavored consumables, and more specifically citrus flavored savoury consumables with improved aroma perception and to deliver a taste perception which is more authentic towards a freshly squeezed citrus juice with pulpy, fresh, peely and sour attributes.

SUMMARY OF THE INVENTION

In one embodiment, a flavour composition includes a characterizing citrus flavour; and a taste modifying composition. The taste modifying composition includes at least two aliphatic amino acids; at least one additional amino acid selected from the group consisting of acidic, basic, aromatic, hydroxylic and mixtures thereof; at least one organic acid; at least one sugar and at least one mineral.

In another embodiment, a savoury consumable includes a flavour composition including a characterizing citrus flavour; and a taste modifying composition. The taste modifying composition includes at least three aliphatic amino acids; at least two additional amino acids selected from the group consisting of acidic, basic, aromatic, hydroxylic and mixtures thereof; at least one organic acid; at least one sugar and at least one mineral.

In yet another embodiment, a method of improving organoleptic properties of a savoury consumable, including taste, aroma, and/or impact, includes the steps of: the sequential, separate or simultaneous admixture of a characterizing citrus flavour; and a taste modifying composition and incorporating the admixture into a savoury consumable. The taste modifying composition includes at least two aliphatic amino acids; at least one additional amino acid selected from the group consisting of acidic, basic, aromatic, hydroxylic and mixtures thereof; at least one organic acid; at least one sugar and at least one mineral.

These and other features, aspects and advantages of specific embodiments will become evident to those skilled in the art from a reading of the present disclosure.

DETAILED DESCRIPTION OF THE INVENTION

The following text sets forth a broad description of numerous different embodiments of the present disclosure. The description is to be construed as exemplary only and does not describe every possible embodiment since describing every possible embodiment would be impractical, if not impossible. It will be understood that any feature, characteristic, component, composition, ingredient, product, step or methodology described herein can be deleted, combined with or substituted for, in whole or part, any other feature, characteristic, component, composition, ingredient, product, step or methodology described herein. Numerous alternative embodiments could be implemented, using either current technology or technology developed after the filing date of this patent, which would still fall within the scope of the claims. All publications and patents cited herein are incorporated herein by reference.

The present disclosure is based on the surprising discovery that a combination of a characterizing citrus flavour and a taste modifying composition, incorporated into consumables could improve the aroma profile and deliver the effect of freshly squeezed citrus. In particular, this combination of ingredients was found to possess improved fresh squeezed qualities, which could not be achieved by any other compositions known in the art.

As used herein, the term "taste" is used to describe the sensory response related to taste receptors. The quality of taste may be expressed as the interplay of descriptors. For example, "juicy", associated with mouthfeel of a 100% juice beverage; "sour", associated with acids in solution; "pulpy", associated with pulp in a fresh squeezed orange juice; and "peely", associated with the peel and skin of citrus fruits. This list of descriptors is not limitative and descriptors may change depending on the nature of the flavour composition.

The term "aroma" as used herein is used to describe the effect of volatile components of the flavour composition that induce a sensory response associated with olfactive receptors.

The term "impact" as used herein is used to describe the overall intensity of the sensory response of the "taste" and "aroma" defined herein above.

Flavour Composition

According to the present disclosure, flavour compositions may include a characterizing flavour; and a taste modifying composition. In one embodiment, the taste modifying compositions include at least two aliphatic amino acids; at least one additional amino acid selected from the group consisting of acidic, basic, aromatic, hydroxylic and mixtures thereof; at least one organic acid; at least one sugar and at least one mineral. The flavour compositions may also include other optional ingredients for particular applications.

The characterizing flavour and the taste modifying composition should be present in the flavor composition in an organoleptically effective amount. This amount will depend upon the nature of the characterizing flavour and taste modifying composition, as well as the nature of the flavor composition and the effect that is desired to be achieved, and it is within the purview of the skilled person to experiment with the desired amounts.

The flavour compositions of the present disclosure may be used in a wide variety of consumables or applications and is not restricted to any particular physical mode or product form. According to the present disclosure, the term "consumable" refers to products for consumption by a subject, typically via the oral cavity (although consumption may occur via non-oral means such as inhalation), for at least one of the purposes of enjoyment, nourishment, or health and wellness benefits. Consumables may be present in any form including, but not limited to, liquids, solids, semi-solids, tablets, capsules, lozenges, strips, powders, gels, gums, pastes, slurries, syrups, aerosols and sprays. The term also refers to, for example, dietary and nutritional supplements. Consumables include compositions that are placed within the oral cavity for a period of time before being discarded but not swallowed. It may be placed in the mouth before being consumed, or it may be held in the mouth for a period of time before being discarded.

Broadly, consumables include, but are not limited to, foodstuffs of all kinds, savoury products, confectionery products, baked products, sweet products, fermented products, dairy products, beverages, oral care products, nutraceuticals and pharmaceuticals.

Exemplary foodstuffs include, but are not limited to, chilled snacks, sweet and savoury snacks, fruit snacks, chips/crisps, extruded snacks, tortilla/corn chips, popcorn, pretzels, nuts, other sweet and savoury snacks, snack bars, granola bars, breakfast bars, energy bars, fruit bars, other snack bars, meal replacement products, slimming products, convalescence drinks, ready meals, canned ready meals, frozen ready meals, dried ready meals, chilled ready meals, dinner mixes, meat analogues, frozen pizza, chilled pizza, soup, canned soup, dehydrated soup, instant soup, chilled soup, UHT soup, frozen soup, pasta, canned pasta, dried pasta, chilled/fresh pasta, noodles, plain noodles, instant noodles, cups/bowl instant noodles, pouch instant noodles, chilled noodles, snack noodles, dried food, dessert mixes, sauces, dressings and condiments, herbs and spices, spreads, jams and preserves, honey, chocolate spreads, nut-based spreads, and yeast-based spreads.

Exemplary savoury products include, but are not limited to, salty snacks (potato chips, crisps, nuts, tortilla-tostada, pretzels, cheese snacks, corn snacks, potato-snacks), ready-to-eat popcorn, microwaveable popcorn, pork rinds, nuts, crackers, cracker snacks, breakfast cereals, meats, aspic, cured meats (ham, bacon), luncheon/breakfast meats (hotdogs, cold cuts, sausage), tomato products, margarine, peanut butter, soup (clear, canned, cream, instant, ultrahigh temperature "UHT"), canned vegetables, mayonnaise, vegan mayonnaise and pasta sauces.

Exemplary confectionery products include, but are not limited to, chewing gum (which includes sugarized gum, sugar-free gum, functional gum and bubble gum), centerfill confections, chocolate and other chocolate confectionery, medicated confectionery, lozenges, tablets, pastilles, mints, standard mints, power mints, chewy candies, hard candies, boiled candies, breath and other oral care films or strips, candy canes, lollipops, gummies, jellies, fudge, caramel, hard and soft panned goods, toffee, taffy, liquorice, gelatin candies, gum drops, jelly beans, nougats, fondants, combinations of one or more of the above, and edible flavour compositions incorporating one or more of the above.

Exemplary baked products include, but are not limited to, alfajores, bread, packaged/industrial bread, unpackaged/artisanal bread, pastries, cakes, packaged/industrial cakes, unpackaged/artisanal cakes, cookies, chocolate coated biscuits, sandwich biscuits, filled biscuits, savoury biscuits and crackers, bread substitutes.

Exemplary sweet products include, but are not limited to, breakfast cereals, ready-to-eat ("rte") cereals, family breakfast cereals, flakes, muesli, other ready to eat cereals, children's breakfast cereals, hot cereals.

Exemplary dairy products include, but are not limited to, cheese, cheese sauces, cheese-based products, ice cream, impulse ice cream, single portion dairy ice cream, single portion water ice cream, multi-pack dairy ice cream, multi-pack water ice cream, take-home ice cream, take-home dairy ice cream, ice cream desserts, bulk ice cream, take-home water ice cream, frozen yoghurt, artisanal ice cream, dairy products, milk, fresh/pasteurized milk, full fat fresh/pasteurized milk, semi skimmed fresh/pasteurized milk, long-life/uht milk, full fat long life/uht milk, semi skimmed long life/uht milk, fat-free long life/uht milk, goat milk, condensed/evaporated milk, plain condensed/evaporated milk, flavoured, functional and other condensed milk, flavoured milk drinks, dairy only flavoured milk drinks, flavoured milk drinks with fruit juice, soy milk, sour milk drinks, fermented dairy drinks, coffee whiteners, powder milk, flavoured powder milk drinks, cream, yoghurt, plain/natural yoghurt, flavoured yoghurt, fruited yoghurt, probiotic yoghurt, drinking yoghurt, regular drinking yoghurt, probiotic drinking yoghurt, chilled and shelf-stable desserts, dairy-based desserts, soy-based desserts.

Exemplary beverages include, but are not limited to, flavoured water, soft drinks, fruit drinks, coffee-based drinks, tea-based drinks, juice-based drinks (includes fruit and vegetable), milk-based drinks, gel drinks, carbonated or non-carbonated drinks, powdered drinks, alcoholic or non-alcoholic drinks, and ready to drink liquid formulations of these beverages.

Exemplary fermented foods include, but are not limited to, cheese and cheese products, meat and meat products, soy and soy products, fish and fish products, grain and grain products, fruit and fruit products and beverage and beverage products.

In one embodiment, consumables may be pasteurized. The pasteurization process may include, for example, ultra-high temperature (UHT) treatment and/or high temperature-short time (HTST) treatment. The UHT treatment includes subjecting the consumable to high temperatures, such as by direct steam injection or steam infusion, or by indirect heating in a heat exchanger. Generally, after the product is pasteurized, the product can be cooled as required by the particular product composition/configuration and/or the package filling application. For example, in one embodiment, the consumable is subjected to heating to about 185° F. (85° C.) to about 250° F. (121° C.) for a short period of time, for example, about 1 to 60 seconds, then cooled quickly to about 36° F. (2.2° C.)+/10° F. (5° C.) for refrigerated products, to ambient temperature for shelf stable or refrigerated products, and to about 185° F. (85° C.)+/−10° F. (5° C.) for hot-fill applications for shelf-stable products. The pasteurization process is typically conducted in a closed system, so as not to expose the consumable to atmosphere or other possible sources of contamination. Other pasteurization or sterilization techniques may also be useful, such as, for example, aseptic or retort processing. In addition, multiple pasteurization processes may be carried out in series or parallel, as necessitated by the consumable or ingredients.

Consumables may, in addition, be post processed. Post processing is typically carried out following addition of the seed delivery system. Post processing can include, for example, cooling the product solution and filling it into container for packaging and shipping. Post processing may also include deaeration of the consumable to <4.0 ppm oxygen, in another embodiment <2.0 ppm and in yet another embodiment <1.0 ppm oxygen. Deaeration, however, and other post processing tasks may be carried out prior to processing, prior to pasteurization, prior to mixing with the seed delivery system and/or at the same time as adding the seed delivery system. In addition, an inert gas (e.g., nitrogen or argon) headspace may be maintained during the intermediary processing of the product and final packaging. Additionally/alternatively, an oxygen or UV radiation barriers and/or oxygen scavengers could be used in the final packaging.

In one embodiment, a flavour composition according to the present disclosure may include a characterizing flavor. The term "characterizing flavour" refers to a flavour that is perceived by an individual to be predominant upon consumption by the individual. In one embodiment, the characterizing flavour may be a citrus flavour derived from the genus citrus, for example, lemon, lime, orange, tangerine, grapefruit, pomelo, key lime, kaffir lime, clementine, mandarin, blood orange, kumquat or yuzu. Accordingly, an individual may perceive a predominant citrus flavour upon consumption of the composition.

Suitable citrus characterizing flavours include, for example, lime or lemon flavouring available from Givaudan Flavors Corporation.

The flavour composition may include the characterizing flavour in an amount from about 0.01 to about 10%, in another embodiment from about 0.01 to about 5%, in yet another embodiment from about 0.01 to about 1%, or any individual number within the range, by weight of the flavour composition. In another embodiment, a consumable may include the characterizing flavour in an amount from about 0.001 to about 0.5%, in another embodiment from about 0.01 to about 0.3%, in yet another embodiment from about 0.02 to about 0.1%, or any individual number within the range, by weight of the consumable.

A flavour composition according to the present disclosure may also include a taste modifying composition. In one embodiment, the taste modifying composition includes aliphatic amino acids; at least one additional amino acid selected from the group consisting of acidic, basic, aromatic, hydroxylic and mixtures thereof; an organic acid; at least one sugar and at least one mineral.

In a typical embodiment, the flavour composition includes from about 0.01% to about 10% of the taste modifying composition, by weight of the flavour composition, and depending upon the particular application desired. In one embodiment, the flavour composition comprise from about 0.01% to about 5% of the taste modifying composition, by weight of the flavour composition. In another embodiment, the flavour composition may comprise from about 0.01% to about 1% or any individual number within the range of the taste modifying composition, by weight of the flavour composition.

In one embodiment, the taste modifying composition according to the present disclosure may include at least two aliphatic amino acids. Suitable aliphatic amino acids include, for example, glycine, alanine, valine, proline, leucine and isoleucine. In another embodiment, the taste modifying composition may include at least three aliphatic amino acids, in another embodiment at least four aliphatic amino acids; in another embodiment at least five aliphatic amino acids; and in yet another embodiment at least six aliphatic amino acids.

In a typical embodiment, the taste modifying compositions include from about 1 ppm to about 20,000 ppm of aliphatic amino acids, by weight of the flavour composition, and depending upon the particular application desired. In one embodiment, the taste modifying compositions comprise from about 5 ppm to about 10,000 ppm of aliphatic amino acids, by weight of the composition. In another embodiment, the taste modifying composition may comprise from about 10 ppm to about 2000 ppm or any individual number within the range of aliphatic amino acids, by weight of the composition.

In one embodiment, the taste modifying composition according to the present disclosure may also include at least one additional amino acid selected from the group consisting of acidic, basic, aromatic, hydroxylic and mixtures thereof. In one embodiment, acidic amino acids may be selected from the group consisting of aspartic acid, glutamic acid and mixtures thereof. In one embodiment, basic amino acids may be selected from the group consisting of histidine, lysine, arginine and mixtures thereof. In one embodiment, aromatic amino acids may be selected from the group consisting of phenylalanine, tyrosine, tryptophan, histidine and mixtures thereof. In another embodiment, hydroxylic amino acids may be selected from the group consisting of serine, threonine and mixtures thereof.

In a typical embodiment, the taste modifying compositions include from about 1 ppm to about 20,000 ppm of the at least one additional amino acid, by weight of the flavour composition, and depending upon the particular application desired. In one embodiment, the taste modifying compositions comprise from about 5 ppm to about 15,000 ppm of the at least one additional amino acid, by weight of the composition. In another embodiment, the taste modifying composition may comprise from about 10 ppm to about 10,000 ppm or any individual number within the range of the at least one additional amino acid, by weight of the composition.

In one embodiment, the taste modifying composition according to the present disclosure may also include at least one organic acid. The at least one organic acid may be selected from a broad range of organic acids, such as citric acid, malic acid, fumaric acid, tartaric acid, lactic acid, ascorbic acid, oxalic acid, malonic acid, uronic acid, quinic acid, succinic acid, levulinic acid, and mixtures thereof. In one embodiment, the at least one organic acid may be selected from organic acids, which are naturally occurring in fruits, such as citric acid, malic acid, fumaric acid, and tartaric acid, and mixtures thereof (e.g. fumaric acid combined with tartaric acid or malic acid).

In a typical embodiment, the taste modifying compositions include from about 100 ppm to about 900,000 ppm of the at least one organic acid, by weight of the flavour composition, and depending upon the particular application desired. In one embodiment, the taste modifying compositions comprise from about 500 ppm to about 750,000 ppm of the at least one organic acid, by weight of the composition. In another embodiment, the taste modifying composition may comprise from about 1000 ppm to about 500,000 ppm or any individual number within the range of the at least one organic acid, by weight of the composition.

In one embodiment, the taste modifying composition according to the present disclosure may also include at least one sugar. Suitable sugars, include but are not limited to, fructose, sucrose, and other natural occurring sugars and compositions include from about 0.1 ppm to about 2000 ppm of the at least one sugar, by weight of the flavour composition, and depending upon the particular application desired.

The taste modifying compositions may also include at least one mineral. Suitable minerals, include but are not limited to, potassium, sodium, calcium, magnesium or salts thereof. In a typical embodiment, the taste modifying compositions include from about 1 ppm to 100,000 ppm of the at least one mineral, by weight of the flavour composition, and depending upon the particular application desired. In one embodiment, the taste modifying compositions comprise from about 5 ppm to about 50,000 ppm of the at least one mineral, by weight of the composition. In another embodiment, the taste modifying composition may comprise from about 10 ppm to about 1000 ppm or any individual number within the range of the at least one mineral, by weight of the composition.

The taste modifying compositions may, optionally, include additional ingredients which include, but are not limited to, fillers, flowing agents, carriers, delivery systems, weighting agents, emulsifiers and stabilizers. Suitable fillers include, but are not limited to, flour, rice, maltodextrins, modified starches, gums, cellulose, medium chain triglyceride, alginates, silicon dioxide, whey powder and pectines. When a filler is employed in the flavour composition, it may be used in amounts from 0 to about 99%, by weight of the flavour composition. Suitable free flowing agents or anti-caking agents include, but are not limited to, aluminum silicate, calcium aluminum silicate, calcium carbonate, calcium silicate, magnesium carbonate, magnesium silicate, mono-, di- and tri-calcium orthophosphate, potassium aluminum silicate, silicon dioxide (amorphous), sodium aluminum silicate and stearic acid salts. When a free flowing agent or anticaking agent is employed in the flavour composition, it may be used in amounts from 0 to about 10%, by weight of the flavour composition.

A flavour composition according to the present disclosure may be prepared when the characterizing citrus flavour; and a taste modifying composition and any other optional ingredients referred to hereinabove are mixed together to form the flavour composition.

The manner or sequence in which the ingredients are mixed is not particularly important, although when selecting the method in which the essential or optional ingredients are combined, the skilled person will have regard to routine considerations related to supply chain, such as ease and cost of manufacture, storage, transportation and the like. In particular, the skilled person will have regard for any incompatibility that might exist between any of the ingredients, for example, immiscibility of ingredients.

In principle, it is possible that all ingredients may be mixed together extemporaneously to provide the flavour composition according to the present disclosure. However, for the reasons set forth immediately above, extemporaneous preparation may not be advantageous or even desirable.

Flavour compositions may be in the form of emulsions, solutions or dispersions, or in powdered form. For example, it may be desirable or appropriate to add flavour ingredients that are oils, or are oil-soluble to a solution containing all water-soluble ingredients and emulsify the resultant mixture. The flavour composition, in the form of an emulsion could then be further diluted in an aqueous phase, as necessary or appropriate.

Alternatively, it might be desirable or appropriate to mix both oil and oil-soluble ingredients, and water-soluble ingredients with a compatible solvent or solvent system, such as propylene glycol, isopropanol, glycerol, ethanol, water, or mixtures thereof to form a flavour composition in the form of a solution or dispersion, which can then be further diluted in an aqueous phase as necessary or appropriate.

In yet another alternative, the characterizing citrus flavour; and the taste modifying composition including at least three aliphatic amino acids; at least one additional amino acid; at least one organic acid; and at least one mineral may be rendered in dry form, and mixed to form a flavour composition in the form of a powder.

EXAMPLES

The following examples are given solely for the purpose of illustration and are not to be construed as limitations of the present invention, as many variations of the invention are possible without departing from the spirit and scope of the present disclosure.

Example 1—Citrus Freshness (Lime)

The first flavour composition includes a characterizing lime flavour in a curry-coconut base (Example A—control). The second flavour composition includes the same characterizing lime flavour in a curry-coconut base and also includes a taste modifying composition according to the present disclosure (Example B).

TABLE 1

| Ingredients (ppm) | A (Control) | B |
| --- | --- | --- |
| Characterizing Flavour Lime flavour[1] | 500 | 500 |
| Taste Modifying Composition | 0 | 1100 |
| Aliphatic amino acids | | 13.1 |
| Additional amino acid(s) | | 16.2 |
| Organic acid(s) | | 891.8 |
| Sugar(s) | | 0.2 |
| Mineral salt(s) | | 54.4 |
| Optional ingredients | | 124.3 |

[1]Commercial flavour available from Givaudan Flavors Corporation

Example 2—Citrus Freshness (Lemon)

The first flavour composition includes a characterizing lemon flavour in a commercial mayonnaise base (Example C—control). The second flavour composition includes the same characterizing lemon flavour in a commercial mayonnaise base and also includes a taste modifying composition according to the present disclosure (Example D).

TABLE 2

| Ingredients (ppm) | C (Control) | D |
| --- | --- | --- |
| Characterizing Flavour Lemon flavour[1] | 500 | 500 |
| Taste Modifying Composition | 0 | 1100 |
| Aliphatic amino acids | | 12.9 |
| Additional amino acid(s) | | 5.6 |
| Organic acid(s) | | 902.6 |
| Sugar(s) | | 0.2 |
| Mineral salt(s) | | 54.5 |
| Optional ingredients | | 124.3 |

[1]Commercial flavour available from Givaudan Flavors Corporation

Sensory Results

Key sensory attributes related to citrus freshness of the samples (A-D) have been assessed by a panel of 8 sensory trained technical panelists tasting blind by comparing the samples A and B in Table 1 and samples C and D in Table 2. The attributes of Samples B and D were compared to the references A and C, respectively based on the scale in Table 3.

TABLE 3

Expert Sensory (Freshness Score)

| Score | Description Corresponding to Score |
|---|---|
| 2 | Higher than reference |
| 1 | Slightly higher than reference |
| 0 | Same as reference |
| −1 | Slightly lower than reference |
| −2 | Lower than reference |

The results are documented below (Tables 4 and 5) for four different formulations (Examples A-D). The results are recorded as an average of the panelist's scores.

TABLE 4

| | Freshness Score | |
|---|---|---|
| Key Sensory Attribute | Example A (characterizing lime flavour only) | Example B (characterizing lime flavour plus taste modifying composition) |
| Sour | 0 | 1.5 |
| Salivating | 0 | 1.3 |
| Juicy | 0 | 0.8 |
| Lime Candy | 0 | −0.6 |
| Lime Fresh | 0 | 1.4 |
| Body | 0 | 0.5 |
| Pulpy | 0 | 0.5 |
| Peely | 0 | 0.4 |

As shown above, Example B (representative of the invention) is less intense in lime candy compared to Example A. Example B is also found to have an increased intensity with respect to the attributes sour, salivating, juicy, lime fresh, body, pulpy and peely with sour, salivating, juicy and lime fresh being the most dominant.

TABLE 5

| | Freshness Score | |
|---|---|---|
| Key Sensory Attribute | Example C (characterizing lemon flavour only) | Example D (characterizing lemon flavour plus taste modifying composition) |
| Sour | 0 | 1.4 |
| Salivating | 0 | 0.9 |
| Juicy | 0 | 0.9 |
| Lemon Candy | 0 | −0.5 |
| Lemon Fresh | 0 | 1.1 |
| Body | 0 | 0.0 |
| Pulpy | 0 | 0.4 |
| Peely | 0 | 0.1 |

As shown above, Example D (representative of the invention) is less intense in lemon candy compared to Example C. Example D is also found to have an increased intensity with respect to the attributes sour, salivating, juicy, lime fresh, pulpy and peely with sour, salivating, juicy and lemon fresh being the most dominant.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A flavour composition comprising:
   a characterizing citrus flavour; and
   a taste modifying composition including at least two aliphatic amino acids; at least one additional amino acid selected from the group consisting of acidic, basic, aromatic, hydroxylic amino acids and mixtures thereof; at least one organic acid; at least one sugar and at least one mineral;
   wherein the flavour composition includes from about 0.01% to about 1% by weight of the characterizing citrus flavour; and
   wherein the flavour composition includes from about 0.01% to about 1% by weight of the taste modifying composition.

2. The flavour composition according to claim 1, wherein the characterizing citrus flavour is selected from the genus citrus.

3. The flavour composition according to claim 2, wherein the citrus flavour is selected from the group consisting of lemon, lime, orange, tangerine, grapefruit, pomelo, key lime, kaffir lime, clementine, mandarine, blood orange, kumquat, yuzu and mixtures thereof.

4. The flavour composition according to claim 1, wherein the at least two aliphatic amino acids are selected from the group consisting of glycine, alanine, valine, proline, leucine, isoleucine and mixtures thereof.

5. The flavour composition according to claim 1, wherein the acidic amino acids are selected from the group consisting of aspartic acid, glutamic acid and mixtures thereof.

6. The flavour composition according to claim 1, wherein the basic amino acids are selected from the group consisting of histidine, lysine, arginine and mixtures thereof.

7. The flavour composition according to claim 1, wherein the aromatic amino acids are selected from the group consisting of phenylalanine, tyrosine, tryptophan, histidine and mixtures thereof.

8. The flavour composition according to claim 1, wherein the hydroxylic amino acids are selected from the group consisting of serine, threonine and mixtures thereof.

9. The flavour composition according to claim 1, wherein the at least one organic acid is selected from the group consisting of citric acid, malic acid, fumaric acid, tartaric acid, lactic acid, ascorbic acid, oxalic acid, malonic acid, uronic acid, quinic acid, succinic acid, levulinic acid and mixtures thereof.

10. The flavour composition according to claim 1, wherein the at least one mineral is selected from the group consisting of potassium, sodium, calcium, magnesium and salts thereof.

11. The flavour composition according to claim 1, further comprising a filler and a flowing agent.

12. A consumable comprising the flavour composition according to claim 1.

13. The flavour composition according to claim 1, wherein the flavour composition is in the form of an emulsion, a solution or a powder.

14. A savoury consumable comprising:
a flavour composition including a characterizing citrus flavour; and a taste modifying composition including at least three aliphatic amino acids; at least two additional amino acids selected from the group consisting of acidic, basic, aromatic, hydroxylic amino acids and mixtures thereof; at least one organic acid; at least one sugar and at least one mineral; wherein the flavour composition includes from about 0.01% to about 1% by weight of the characterizing citrus flavour; and wherein the flavour composition includes from about 0.01% to about 1% by weight of the taste modifying composition.

15. A method of improving organoleptic properties of a savoury consumable, including taste, aroma, and/or impact, the method comprising:
the sequential, separate or simultaneous admixture of a characterizing citrus flavour; and a taste modifying composition including at least two aliphatic amino acids; at least one additional amino acid selected from the group consisting of acidic, basic, aromatic, hydroxylic amino acids and mixtures thereof; at least one organic acid; at least one sugar and at least one mineral; wherein the admixture includes from about 0.01% to about 1% by weight of the characterizing citrus flavour; and wherein the admixture includes from about 0.01% to about 1% by weight of the taste modifying composition, and incorporating the admixture into a savoury consumable.

* * * * *